United States Patent
Dettmer

(10) Patent No.: US 6,745,574 B1
(45) Date of Patent: Jun. 8, 2004

(54) MICROTURBINE DIRECT FIRED ABSORPTION CHILLER

(75) Inventor: Gregory Brian Dettmer, Jensen Beach, FL (US)

(73) Assignee: Elliott Energy Systems, Inc., Stuart, FL (US)

(*) Notice: Subject to any disclaimer, the term of this patent is extended or adjusted under 35 U.S.C. 154(b) by 0 days.

(21) Appl. No.: 10/306,259

(22) Filed: Nov. 27, 2002

(51) Int. Cl.$^7$ .............................. F02C 7/10; F02C 6/18; F25B 27/02
(52) U.S. Cl. ..................... 60/784; 60/39.511; 60/39.5
(58) Field of Search ............... 60/39.5, 39.511, 60/784

(56) References Cited

U.S. PATENT DOCUMENTS

| | | | | |
|---|---|---|---|---|
| 2,895,294 A | * | 7/1959 | Terrell | 60/39.511 |
| 4,754,607 A | * | 7/1988 | Mackay | 60/723 |
| 5,127,470 A | * | 7/1992 | Inaba et al. | 122/7 R |
| 6,313,544 B1 | * | 11/2001 | Mongia et al. | 290/52 |
| 6,519,946 B2 | * | 2/2003 | Iwamoto et al. | 60/39.511 |
| 6,523,357 B1 | * | 2/2003 | Katayama | 62/141 |

FOREIGN PATENT DOCUMENTS

JP    2001-099520    *  4/2001

* cited by examiner

Primary Examiner—Ted Kim
(74) Attorney, Agent, or Firm—Norman Friedland

(57) ABSTRACT

A direct fired absorption chiller is combined with a microturbine engine that operates to power another medium includes a by-pass valve interconnecting the discharge end of the recuperator and the discharge end of the turbine so as to maintain a constant heat delivered to the chiller. A temperature monitoring sensor actuates the by-pass valve to assure that the proper heat is maintained in the chiller. In the preferred embodiment the microturbine powers an electrical generating system.

3 Claims, 2 Drawing Sheets

MICROTURBINE DIRECT FIRED ABSORPTION CHILLER

TECHNICAL FIELD

This invention relates to chillers utilized in air conditioning systems and more particularly to direct fired absorption chillers that are used in combination with microturbine engines.

BACKGROUND OF THE INVENTION

As one skilled in this technology knows, the direct fired absorption chillers (DFA) are not widely used in this country and, in fact, are not utilized with microturbine engines. While water fired absorption chillers have been known to use the waste heat generated by microturbines, these systems require the use of heat exchangers to interface with the water fired absorption chiller. One of the main reasons that the microturbine engine cannot effectively be utilized with the DFA is because the temperature of the exhaust gases vary depending on the load and ambient characteristics of the microturbine. As is well known, the DFA utilizes the environmentally compatible combination of water and an absorbent and a burner to generate the heat necessary to carry out the absorption process. Direct fired absorption refrigeration is initiated when higher pressure liquid refrigerant solution form a condenser is discharged through an expansion device and into a lower pressure evaporator and collects therein. Expansion and "flashing" of the refrigerant solution occurs and the liquid refrigerant is collected in the sump of the evaporator. There is also the transfer of heat into the collected and cooled refrigerant solution from comparatively warm system water that is pumped through a cooling tower causing the collected refrigerant solution to evaporate, resulting in vapor that is transferred to an absorber where it is absorbed into a refrigerant solution, such as lithium bromide. This process creates a low pressure in the absorber that draws a continuous flow of refrigerant from the evaporator to the absorber, but also causes the vapor to condense as it releases the heat of vaporization in the evaporator. This heat and the heat of dilution produced as the refrigerant condensate mixes with the absorbent and is transferred into a cooling tower water and is carried out of the absorber. The assimilation of water refrigerant dilutes the lithium-bromide refrigerant solution and reduces its affinity for refrigerant vapor. In order to sustain the refrigeration cycle the solution is then reconcentrated by continuously pumping the dilute refrigerant solution from the absorber to a generator where heat is applied to distill the water refrigerant from the absorber. As the water refrigerant is removed by distillation, the re-concentrated lithium-bromide solution is returned through the absorber and to the generator to resume the absorption process, while the liberated refrigerant vapor from the generator is transferred to the cooler condenser and returned to its liquid state as the cooling tower absorbs the heat of condensation carried by vapor. The liquid's return from the generator to the expansion device completes the cycle. Of course, this type of system replaces the more costly and typical fluorinated hydrocarbon compounds required by vapor compression refrigeration. The DFA system is considered to be stable, non-toxic and readily absorbed and easily separated in large volume during the absorption process.

This invention is principally concerned with producing the heat that is necessary to carry out the absorption process and particularly the waste heat that is generated by a microturbine engine. Although not limited thereto to the microturbines that are utilized for generating electricity is particularly efficacious for use with the direct fired absorption chiller.

As one skilled in this art will appreciate, it is abundantly important that the amount of heat and consistency of the heat source is required to operate the direct fired absorption chiller efficiently. This invention contemplates utilizing the heat discharging from the microturbine engine that is designed to power an electric generator and controlling the heat so that it is at the proper temperature to operate the chiller and that the temperature is controlled to be maintained at a consistent level, i.e. it is held at a constant temperature.

SUMMARY OF THE INVENTION

The object of this invention is the combination of a direct fired chiller and the microturbine engine.

A feature of this invention is the interconnection of the recuperator to the direct fired absorption chiller and a controlled by-pass valve that regulates the quantity of waste heat flowing to the chiller and the temperature thereof.

The foregoing and other features of the present invention will become more apparent from the following description and accompanying drawings.

DETAILED DESCRIPTION OF THE INVENTION

While this invention pertains to a microturbine system powering an electrical generator it is to be understood that the microturbine can be utilized for other types of systems and hence, is not limited to an electrical generating system. The microturbine engine has become popular in the last several years and essentially is a jet engine that includes a turbine, compressor, combustor and recuperator. The microturbine is essentially a miniaturized gas turbine engine typically utilized for powering electrical generators. In certain configurations, the turbine and compressor are attached back-to-back on one end of a shaft that is common to the shaft connecting the armature of the electrical generator. Fuel and relatively hot pressurized air discharging from the compressor and recuperator are fed to an annular combustor where they are combined and combusted to further heat and accelerate the engine's working medium for powering the turbine. The engine working medium is adiabatically expanded in the turbine for extracting energy which, in turn, is utilized for rotating the compressor and armature. The working medium after leaving the turbine is directed to the recuperator where it is placed in indirect heat exchange with the compressor discharge air prior to being admitted into the combustor. The turbine exhaust is ultimately discharged from the recuperator. For further details of the microturbine reference should be made to patent application Ser. No.

09/934,640 filed on Aug. 22, 2001 by William R. Ryan entitled RECUPERATOR FOR USE WITH TURBINE/TURBO-ALTERNATOR, published and U.S. Pat. No. 6,314,717 granted to Teets et al on Nov. 13, 2001 entitled ELECTRICITY GENERATING SYSTEM HAVING AN ANNULAR COMBUSTOR both of which are commonly assigned to the assignee of this patent application, and both being incorporated by reference herein. Also, for more details of this invention reference should also be made to the microturbines manufactured by the assignee, Elliott Energy Systems, Inc., of Stuart, Fla. and, particularly of the types exemplified by Model Number TA-80.

Figure 1:
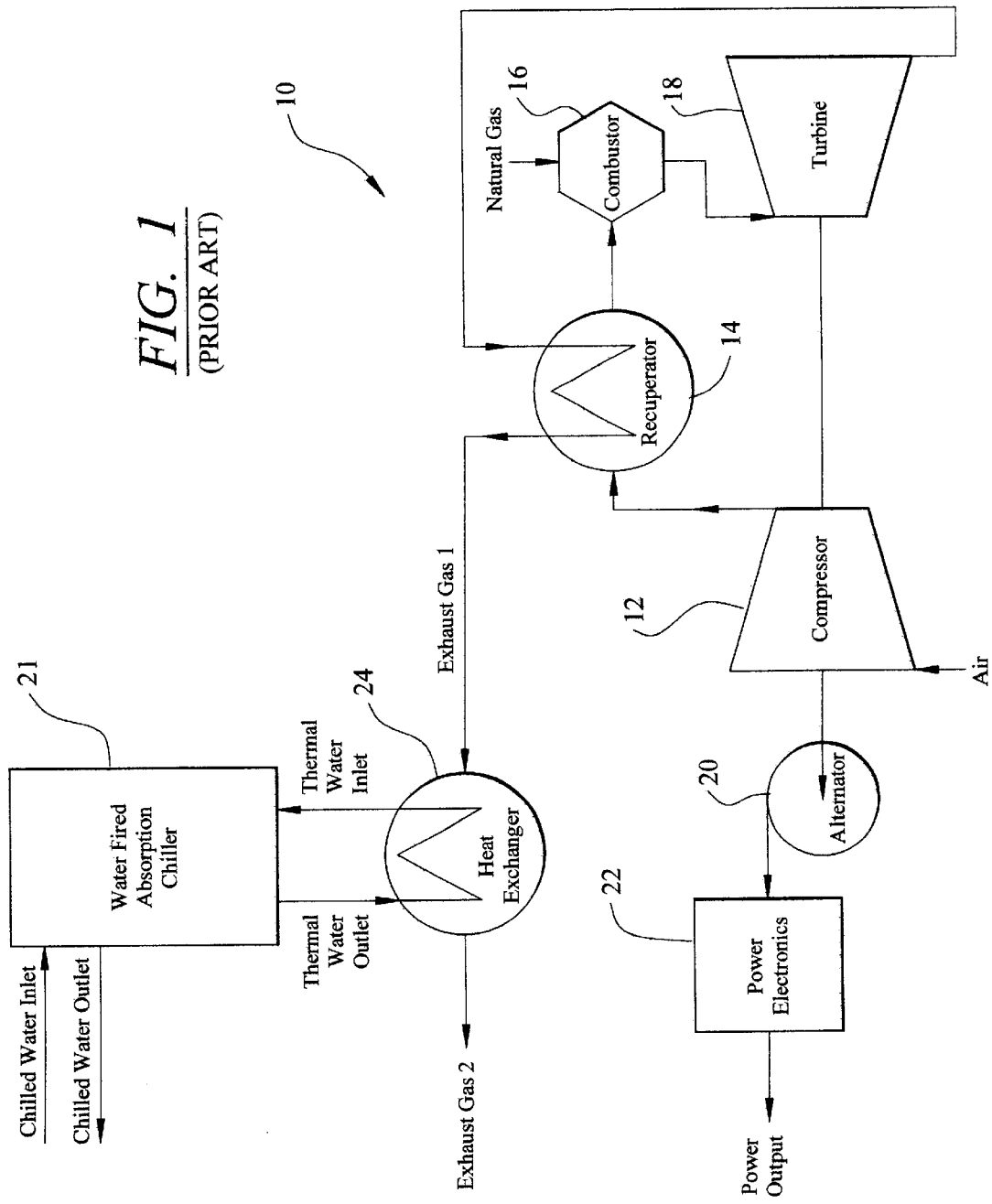
FIG. 1 is a schematic illustration of a prior art system utilizing a microturbine powering an electrical generating system and a water fired absorption chiller illustrating a comparison with this invention.

To better understand this invention, FIG. 1 is included to illustrate the microturbine engine utilized in a heretofore prior art system where the exhaust gases are utilized to power a water fired absorption chiller system by directing the exhaust gases to be placed in indirect heat exchange with the water of the chiller. As shown therein the microturbine is generally illustrated by reference numeral 10 and includes a compressor 12 for compressing the air admitted therein which is preheated by being placed in indirect heat exchange with the turbine discharged gases in the recuperator 14. The preheated compressor combustor 16 where it forms a gases engine working medium for powering the turbine 18. The turbine 18 drives the compressor 12 and the turbine exhaust gases are routed to the recuperator 14 where it serves to preheat the compressor discharge air. The power generated by the microturbine 10 serves to power the alternator 20 which through an inverter and associated electronic circuitry 22 produces the desired electrical output.

As noted in FIG. 1, a well known prior art water fired absorption chiller 21 is powered by the heat generated by the heat exchanger 24 which heats the water feeding the chiller 21. The exhaust gases from the heat exchanger 24 is discharged into ambient.

As is apparent from the foregoing, the system described in connection with the microturbine depicted in FIG. 1 requires a heat exchanger and the temperature and quantity of the gases utilized as the heat source is predicated on the exhaust discharging from the recuperator oft he microturbine engine. The invention to be described immediately hereinbelow, places the exhaust directly into the chiller and hence, eliminates the necessity of a heat exchanger to heat the water of the chiller. By eliminating the heat exchanger it is contemplated that there will be substantially a 30% increase in cooling capacity of the overall system with substantially a 25% reduction in the cooling system costs.

Figure 2:
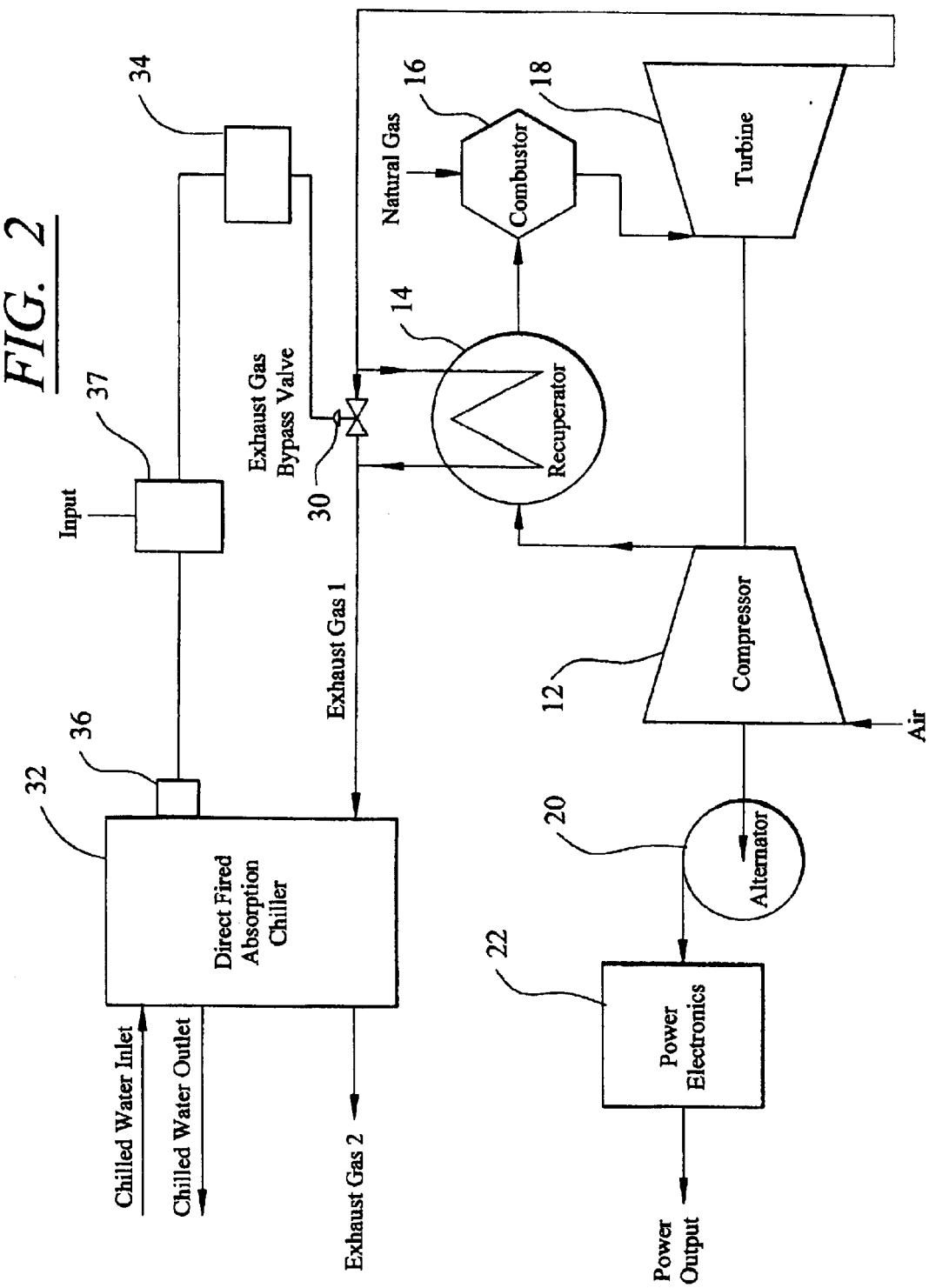
FIG. 2 is a schematic illustration of this invention where a microturbine powering an electrical system as disclosed in FIG. 1 but modified to power a direct fired absorption chiller in accordance with this invention. These figures merely serve to further clarify and illustrate the present invention and are not intended to limit the scope thereof.

According to this invention and as depicted in FIG. 2, the microturbine 10 (all like or substantially like elements bear the same reference numerals in all of the Figures.) includes the compressor 12, turbine 18, combustor 16 and recuperator 14 and like the system in FIG. 1, the microturbine powers an electrical generating system. However, in this embodiment and in accordance recuperator 14 and like the system in FIG. 1, the microturbine powers an electrical generating system. However, in this embodiment and in accordance with this invention a by-pass valve 30 is connected between the recuperator discharge and the exhaust discharge so that opening valve 30 will dump turbine exhaust gases directly in the chiller 32. Hence, the waste heat from the turbine can be utilized directly in the chiller 32, can be combined with waste heat discharging from the recuperator 14 or can be disconnected so that the total heat emanate from the recuperator 14. In order to assure that a constant heat is applied to the chiller 32 a well known and commercially available temperature sensor 36 senses the heat in the chiller 32 and through a suitable control 37 operates the opening and closing of the by-pass valve 30 by virtue of a suitable commercially available actuator 34 to assure that the desired heat in the chiller is maintained. The control 37, which may be a suitable digital comparator, serves to compare the input i.e. the desired temperature and the actual temperature sensed by the sensor 37. Obviously, sensor 37 measures the temperature of the chiller and by virtue of this system assures that the temperature remains constant.

What has been shown by this invention is a method and system that allows the microturbine engine to be utilized to power the direct fired absorption chiller without the necessity of a water to exhaust gas heat exchanger. This system not only improves on the efficiency of the chiller, it also reduces the overall cost of the system.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. A microturbine engine in combination with a direct fired absorption chiller comprising a turbine, a combustor, a compressor and a recuperator, said combustor fluidly connected to said compressor for firing fuel and creating an engine working medium, said turbine being powered by said engine working medium and producing exhaust of said engine working medium, said exhaust being delivered to said recuperator for placing the air discharging from the compressor in indirect heat exchange, and producing recuperator exhaust, said direct fired absorption chiller being fluidly connected to said recuperator exhaust, a bypass valve disposed between the discharge end of said turbine and the discharge end of said recuperator for selectively mixing the turbine exhaust with the recuperator exhaust prior to being delivered to said direct fired absorption chiller, directing all of the turbine exhaust into said recuperator so that only the recuperator exhaust is being delivered to the direct fired absorption chiller, directing all of the turbine exhaust to the direct fired absorption chiller, a controller controlling the bypass valve such that the heat flowing to said direct fired absorption chiller is at a constant predetermined value.

2. A microturbine engine in combination with a direct fired absorption chiller as claimed in claim 1 including a temperature sensor operatively connected to said water chiller for measuring the temperature of the water therein and an actuator operatively connected to said temperature sensor for controlling said by-pass valve.

3. A microturbine engine in combination with a direct fired absorption chiller as claimed in claim 2 including an alternator for generating electricity, said microturbine engine operatively connected to said alternator for rotating said alternator.

* * * * *